US012767863B2

(12) United States Patent
Li et al.

(10) Patent No.: US 12,767,863 B2
(45) Date of Patent: Oct. 20, 2026

(54) CONDUCTIVE HOT MELT ADHESIVE HAVING NEAR-INFRARED LIGHT WELDING CHARACTERISTICS AND PREPARATION METHOD THEREOF

(71) Applicant: JILIN UNIVERSITY, Changchun (CN)

(72) Inventors: Wen Li, Changchun (CN); Lu Fu, Changchun (CN); Jun Fang, Changchun (CN)

(73) Assignee: JILIN UNIVERSITY, Changchun (CN)

( * ) Notice: Subject to any disclaimer, the term of this patent is extended or adjusted under 35 U.S.C. 154(b) by 0 days.

(21) Appl. No.: 19/256,812

(22) Filed: Jul. 1, 2025

(65) Prior Publication Data

US 2026/0167851 A1 Jun. 18, 2026

(30) Foreign Application Priority Data

Dec. 12, 2024 (CN) ........................ 202411827744.0

(51) Int. Cl.

| | |
|---|---|
| ***H01B 1/22*** | (2006.01) |
| ***C08G 75/00*** | (2006.01) |
| ***C09J 9/02*** | (2006.01) |
| ***C09J 11/04*** | (2006.01) |

(Continued)

(52) U.S. Cl.

CPC ................ *C09J 9/02* (2013.01); *C08G 75/00* (2013.01); *C09J 11/04* (2013.01); *C09J 181/00* (2013.01); *H01B 1/22* (2013.01); *C08K 3/08* (2013.01); *C08K 2201/001* (2013.01)

(58) Field of Classification Search

CPC .... H01B 1/22; C09J 9/02; C09J 11/04; H05K 3/321; C08K 2201/001

See application file for complete search history.

(56) References Cited

U.S. PATENT DOCUMENTS 11,616,236 B2 * 3/2023 Takei .................... C08F 216/06 429/209

FOREIGN PATENT DOCUMENTS

| | | |
|---|---|---|
| AU | 2002354086 A1 | 6/2003 |
| CN | 115353836 A | 11/2022 |
| CN | 119019890 A | 11/2024 |

(Continued)

OTHER PUBLICATIONS

Chen et al "Liquid metal flexible electronics: Past, present, and future", Appl. Phys. Rev. 10, 021308 (2023).*

(Continued)

*Primary Examiner* — Mark Kopec

(74) *Attorney, Agent, or Firm* — HOWARD M COHN and Associates, LLC

(57) ABSTRACT

A conductive hot melt adhesive having near-infrared light welding characteristics includes gallium indium liquid metal, lipoic acid and a polyvalent crosslinking agent. The preparation method includes: mixing gallium indium liquid metal, lipoic acid and polyvalent crosslinking agent, placing in an agate mortar and grinding to obtain a precursor powder; heating the precursor powder to obtain the conductive hot melt adhesive having near-infrared light welding characteristics. The present disclosure discloses that the prepared conductive adhesive hot melt adhesive has good electrical conductivity and can achieve effective bonding to a variety of solid bases through near-infrared light irradiation.

11 Claims, 4 Drawing Sheets

(51) Int. Cl.
*C09J 181/00* (2006.01)
*C08K 3/08* (2006.01)

(56) References Cited

FOREIGN PATENT DOCUMENTS

| | | | |
|---|---|---|---|
| EP | 2886578 | A1 | 6/2015 |
| GB | 2349355 | A | 11/2000 |
| JP | 2013004868 | A | 1/2013 |
| WO | 2016125664 | A1 | 8/2016 |

OTHER PUBLICATIONS

Pei et al "Reversible Wet-Adhesive and Self-Healing Conductive Composite Elastomer of Liquid Metal", Adv. Funct. Mater. 2022, 32, 2204257.*

Notification to Grant Patent Right for Invention, Chinese Application No. 202411827744.0, mailed Sep. 15, 2025 (3 pages).

CNIPA, Office Action issued for Chinese Application No. 202411827744.0, mailed Sep. 4, 2025 (7 pages).

Youlin Zhou et al., "Functional materials", Preparation and properties of stretchable conductive wires based on liquid metal, No. 03, pp. 158-161, Issuing date Mar. 31, 2018.

Wen Li et al., "Nano letters", Interfacial Anchoring and Dual-Phase Separation Tame Liquid Metalinto a NIR-Responsive Conductive Adhesive for Remote Electronics Welding and Eco-Recycling, vol. 25, No. 33, pp. 12703-12711, Issuing date Aug. 20, 2025.

Penghao Sun et al., "Industrial Crops and Products", Limonene-thioctic acid-ionic liquid polymer: A self-healing and antibacterial material for movement detection sensor, vol. 189, pp. 1-5, Issuing date Feb. 15, 2023.

* cited by examiner

CONDUCTIVE HOT MELT ADHESIVE HAVING NEAR-INFRARED LIGHT WELDING CHARACTERISTICS AND PREPARATION METHOD THEREOF

CROSS REFERENCE TO RELATED APPLICATIONS

The present disclosure claims the priority to the Chinese patent application with the filing No. 202411827744.0, entitled "CONDUCTIVE HOT MELT ADHESIVE HAVING NEAR-INFRARED LIGHT WELDING CHARACTERISTICS AND PREPARATION METHOD THEREOF" and filed on Dec. 12, 2024 with the Chinese Patent Office, the contents of which are incorporated herein by reference in their entirety.

TECHNICAL FIELD

The present disclosure relates to the technical field of material science, and particularly to a conductive hot melt adhesive having near-infrared light welding characteristics and a preparation method thereof.

BACKGROUND ART

The contemporary advancements in electronization and informatization continuously drive the development of electronic devices in the direction of high integration, miniaturization, lightweight, and high performance, posing new challenges for the assembly techniques of high-density electronic devices. Electronic components, circuit connections, and chip packaging, etc. usually use traditional metal welding technique, which faces challenges such as susceptibility to corrosion, low welding spot strength, welding spot fatigue, cracking caused by internal stress of interconnects, and contamination issues. Therefore, great efforts are made internationally to develop new bonding techniques based on conductive adhesives to replace traditional metal welding. Conductive adhesives are functional adhesives that possess both electrical conductivity and bonding properties, and typically consist of two components: an adhesive polymer resin matrix (commonly epoxy resin, silicone, polyamide, or polyurethane) and conductive fillers (such as metals, carbon materials, and conductive polymers, etc.). Conductive adhesives can establish effective bonding with different substrates, including non-weldable surfaces such as ceramics and glass. Therefore, they are highly favored in various application scenarios of integrated microelectronic products, such as assembly, connection, integration, and packaging. (Zhang D, Liu S, Jiang Y, et al. A flexible adhesive with a conductivity of 5240 S/cm[J]. Science bulletin, 2021, 66(7): 657-660. Kaimin Pang, Zuozhu Deng. A conductive silver adhesive and its preparation method and application: 202211231498 [P]. Haque ABMT, Ho D H, Hwang D, et al. Electrically conductive liquid metal composite adhesives for reversible bonding of soft electronics[J]. Advanced Functional Materials, 2023:2304101.). Currently, the bonding methods of conductive adhesives mainly include pressure-sensitive tape bonding, glue coating, or heat-melting coating, etc. (Jiuyang Zhang, Yan Li. A conductive hot melt adhesive and its preparation method: 202210288276[P]. Latko-Durałek P, Misiak M, Boczkowska A. Electrically conductive adhesive based on thermoplastic hot melt copolyamide and multi-walled carbon nanotubes[J]. Polymers, 2022, 14(20): 4371.). However, pressure-sensitive tapes are limited by their low bonding strength and are only used as coating materials. The glue coating bonding method has a long curing time and limited usage environment, making it difficult to be applied in the bonding of microelectronic components with highly restricted space dimensions. The melt-coating of the conductive hot melt adhesive, as the primary bonding method adopted in electronic component assembly, involves performing contact heating on the conductive adhesive at the welding point until the conductive adhesive melts, and then bonding electronic components, leads, or high-density circuits. This contact heating method is highly likely to cause damage to electronic components, or substrates, etc. around the conductive adhesive, which calls for further improvement.

Therefore, it is an urgent technical problem that needs to be addressed by those skilled in the art to provide a conductive hot melt adhesive having near-infrared light welding characteristics that has good electrical conductivity and enables effective bonding to various solid bases through infrared light irradiation, as well as its preparation method.

SUMMARY

In view of this, the present disclosure provides a light-weldable conductive hot melt adhesive containing a liquid metal and its preparation method. The conductive hot melt adhesive can achieve effective bonding to various materials under heating or near-infrared light irradiation while maintaining its electrical conductivity, making it suitable for fields of packaging and bonding, etc. of electronic components and assemblies.

To achieve the above purpose, the present disclosure adopts the following technical solutions.

A conductive hot melt adhesive having near-infrared light welding characteristics is composed of the following raw materials: gallium indium liquid metal, lipoic acid and a polyvalent crosslinking agent.

Preferably, the above-mentioned conductive hot melt adhesive having near-infrared light welding characteristics is composed of the following raw materials in percentage by mass: 65%-75% of gallium indium liquid metal, 22.5%-27.5% of lipoic acid, and 2.5%-7.5% of polyvalent crosslinking agent.

Further, the mass percentage of gallium in the gallium indium liquid metal is 75.5% to 100%, and the mass fraction of indium is 24.5% to 0%.

The beneficial effects of adopting the above further solution are as follows: in the above solution of the present disclosure, especially when the mass percentage of gallium is 75.5% and that of indium is 24.5% in the gallium indium liquid metal, its melting point is close to 25° C., which is conducive to application.

Further, the gallium indium liquid metal may be replaced by silver nanosheets or silver nanowires.

Further, the polyvalent crosslinking agent is any one or a mixture of more selected from the group consisting of tannic acid, polyvinyl alcohol, N,N,N',N'-tetrakis(2-hydroxyethyl) ethylenediamine, and chitosan.

The beneficial effect of adopting the above further solution is that: the present disclosure can prepare conductive hot melt adhesives with different performances by adjusting the types and contents of the conductive fillers and polyvalent crosslinking agent, which reflects the universality and performance adjustability of the process of the present disclosure.

Further, the light source for the light welding is near-infrared light, the power of the light source is 0.5-2.0 W, and the wavelength of the near-infrared light is 780-1,100 nm.

More further, during the light welding process, the distance between any light source and the conductive hot melt adhesive is 2.5-10.0 cm.

The beneficial effects of adopting the above further solution are as follows: the present disclosure can adjust the melting time of the conductive hot melt adhesive and the temperature of the light source irradiation point by regulating the power of the light source and the distance between the light source and the conductive hot melt adhesive, so that the conductive hot melt adhesive is suitable for various application scenarios.

The present disclosure further provides a method for preparing the conductive hot melt adhesive having near-infrared light welding characteristics, including the following steps:

(1) weighing each raw material according to the above mass percentage;

(2) mixing and placing the gallium indium liquid metal, lipoic acid and polyvalent crosslinking agent in an agate mortar and grinding to obtain a precursor powder; and (3) heating the precursor powder to obtain the conductive hot melt adhesive having near-infrared light welding characteristics.

Further, the grinding time in step (2) is 15-25 min.

Further, in step (3), the heating temperature is 75-85° C., and the heating time is 25-35 min.

More further, the heating is any one of an oil bath, a water bath, an air bath and a metal bath.

The beneficial effect of adopting the above further solution is as follows: the above solution of the present disclosure may make the raw materials mixed uniformly and achieve as complete a reaction as possible.

The beneficial effects of the present disclosure are as follows: the present disclosure discloses a conductive hot melt adhesive having light welding characteristics formed based on a metal conductive component, lipoic acid and a polyvalent crosslinking agent, and a preparation process thereof. The obtained conductive adhesive hot melt adhesive has good electrical conductivity, and may realize effective bonding to various solid bases through near-infrared light irradiation.

The present disclosure uses lipoic acid, a polyvalent crosslinking agent, and a metal conductive component as raw materials. First, the three raw materials are subjected to solid-phase grinding to obtain a precursor powder, and then the precursor powder is heated to prepare the conductive hot melt adhesive having near-infrared light (808 nm) welding characteristics. The preparation process of the conductive hot melt adhesive of the present disclosure is simple, has mild conditions, is time-saving, and is an energy-saving, green and environmentally friendly synthesis method. The obtained conductive hot melt adhesive can be processed into different shapes for storage (such as amorphous powder, microspheres, blocks, etc.). When necessary, it may adhere to different substrates by direct heating or near-infrared light irradiation, and exhibit good bonding performance after room-temperature curing.

DETAILED DESCRIPTION OF EMBODIMENTS

The technical solutions in the embodiments of the present disclosure will be described clearly and completely below in conjunction with the drawings in the embodiments of the present disclosure. It is obvious that the described embodiments are only some of the embodiments of the present disclosure, rather than all the embodiments. Based on the embodiments of the present disclosure, all other embodiments obtained by those of ordinary skilled in the art without creative efforts will fall within the protection scope of the present disclosure.

In the embodiments of the present disclosure, the liquid metal specifically refers to a gallium indium liquid metal composed of gallium 75.5% and indium 24.5%.

EXAMPLE 1

140 mg of liquid metal, 50 mg of lipoic acid, and 10 mg of tannic acid were respectively placed in an agate mortar and ground under a condition of 25° C. for 20 mins to obtain a precursor powder. The precursor powder was then placed in a 3 mL glass bottle and heated in an 80° C. oil bath for 30 mins to obtain a black viscous glue.

Figure 1:
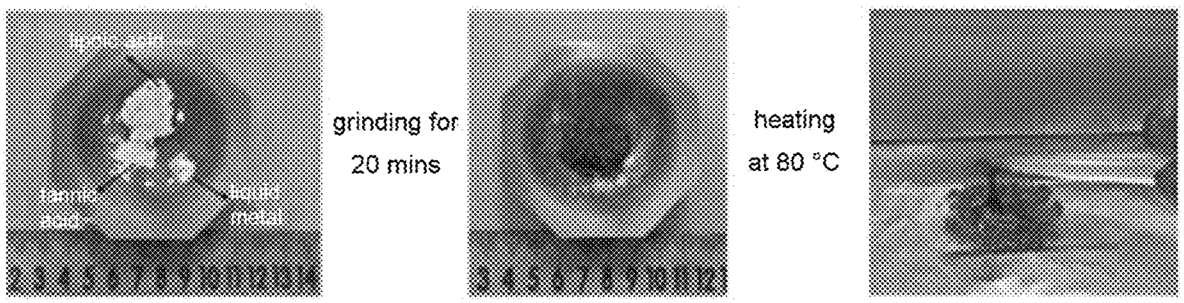
FIG. 1 shows photographs of the solid powders of liquid metal, lipoic acid, and tannic acid before and after grinding in Example 1 of the present disclosure, as well as the digital photograph of the liquid metal/lipoic acid/tannic acid conductive hot melt adhesive formed by heating the ground powder.

FIG. 1 shows photographs of the solid powders of liquid metal, lipoic acid and tannic acid before and after grinding, as well as a digital photograph of the liquid metal/lipoic acid/tannic acid conductive hot melt adhesive formed by heating the ground powder. It can be seen from the figure that the ground powder sample changed, after heated to 80° C., from powder to a viscous jelly that could be drawn, indicating that a hot melt adhesive was formed.

Test Example 1 Electrical Conductivity Test

The liquid metal/lipoic acid/tannic acid conductive hot melt adhesive prepared in Example 1 was placed in a polytetrafluoroethylene mold with a specification of 1.5 cm×1.5 cm×0.05 cm (length×width×height), first heated to 80° C. to make it uniformly spread in the mold, and then naturally cooled to 25° C. and cured for 10 mins. The electrical conductivity rate of the obtained block at 25° C. was measured as $2\times10^4$ S/m by an RTS-9 four-probe tester, demonstrating that the liquid metal/lipoic acid/tannic acid conductive hot melt adhesive prepared in the present disclosure exhibits excellent electrical conductivity.

Figure 2:
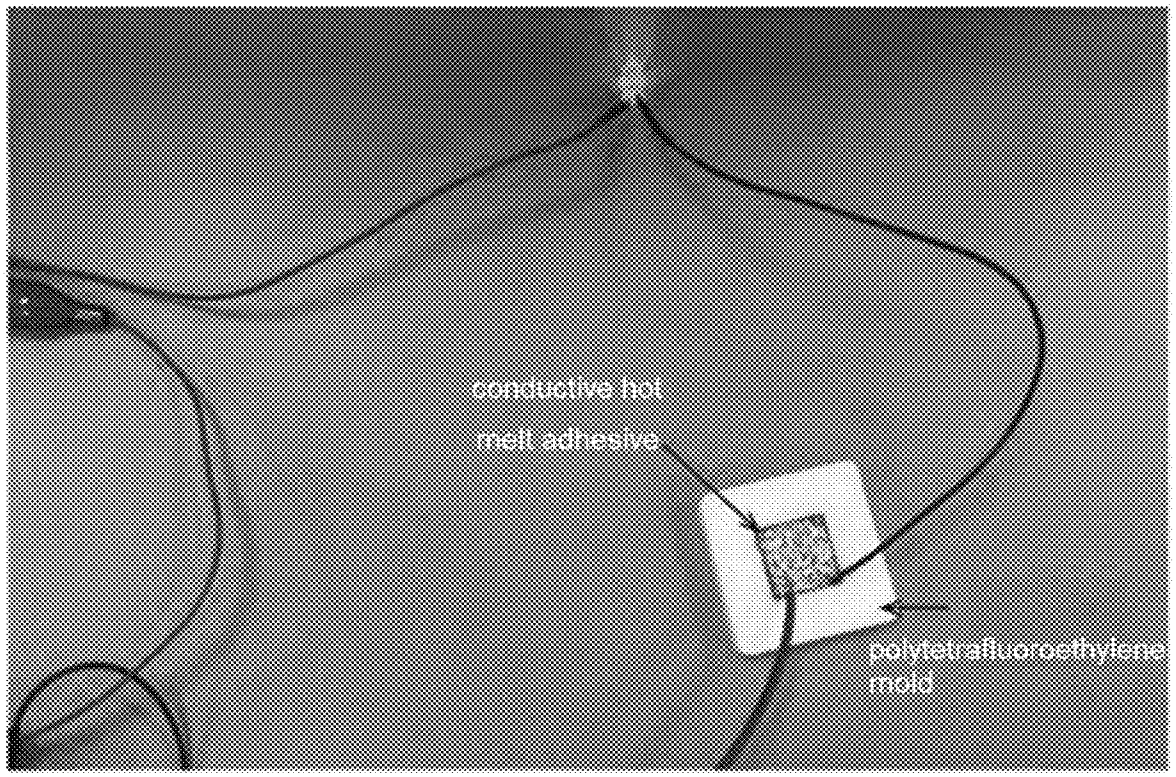
FIG. 2 is a digital photograph showing that the liquid metal/lipoic acid/tannic acid conductive hot melt adhesive prepared in Example 1 of the present disclosure can conduct electricity when connected to an electric circuit after being cured and formed in a mold.

FIG. 2 is a digital photograph showing that the prepared conductive liquid metal/lipoic acid/tannic acid conductive hot melt adhesive can conduct electricity when connected to an electric circuit after being cured and formed in a mold. it can be seen from the figure that an effective conductive path is formed after the liquid metal/lipoic acid/tannic acid conductive hot melt adhesive is cured, formed and connected to an electric circuit, indicating that it has electrical conductivity.

Test Example 2 Bonding Property Test

The liquid metal/lipoic acid/tannic acid conductive hot melt adhesive powder prepared in Example 1 was placed on a nitrile glove and heated to 80° C. by 808 nm near-infrared light. Subsequently, objects made of different materials (including a glass beaker, an agate mortar pestle, a stainless steel weight, a Teflon reagent bottle, a wooden base, and a seashell) were pressed onto the liquid metal/lipoic acid/tannic acid conductive hot melt adhesive on the surface of the nitrile glove. When cooled to 25° C., the liquid metal/lipoic acid/tannic acid conductive hot melt adhesive may be cured to form effective bonding, and the above bonded objects were lifted, demonstrating excellent adhesion property of the conductive hot melt adhesive.

In this test example, a single-column universal material testing machine was used to measure the lap shear strength of the liquid metal/lipoic acid/tannic acid conductive hot melt adhesive onto different bases. Firstly, the liquid metal/lipoic acid/tannic acid conductive hot melt adhesive powder was placed on the surfaces of two bases of the same material (stainless steel, titanium metal, polycarbonate, polypropylene, length×width of 7×1.3 cm). Secondly, the liquid metal/lipoic acid/tannic acid conductive hot melt adhesive was heated to 80° C. by using an air bath, the two bases of the same material were bonded together by means of lap joint, with a lap length of 2 cm, and the thickness of the adhesive layer was controlled at 500 μm by using a steel needle. Subsequently, the bonded bases were cooled to 25° C. in air and cured for 1 h to measure its lap shear strength. Finally, the two ends of the solid bases were vertically fixed on an electronic universal material testing machine and subjected to longitudinal tension at a speed of 10 mm/min, the maximum load required to separate the bonded bases under the action of a load parallel to the adhesive layer at 25° C. was measured, and the shear tensile strength was calculated based on the lap area. The test results show that the lap shear strengths of the obtained liquid metal/lipoic acid/tannic acid conductive hot melt adhesive on titanium, stainless steel, polycarbonate, and polypropylene bases are 2.1±0.1 MPa, 2.0±0.15 MPa, 1.0±0.1 MPa, and 0.52±0.04 MPa, respectively.

Figure 3:
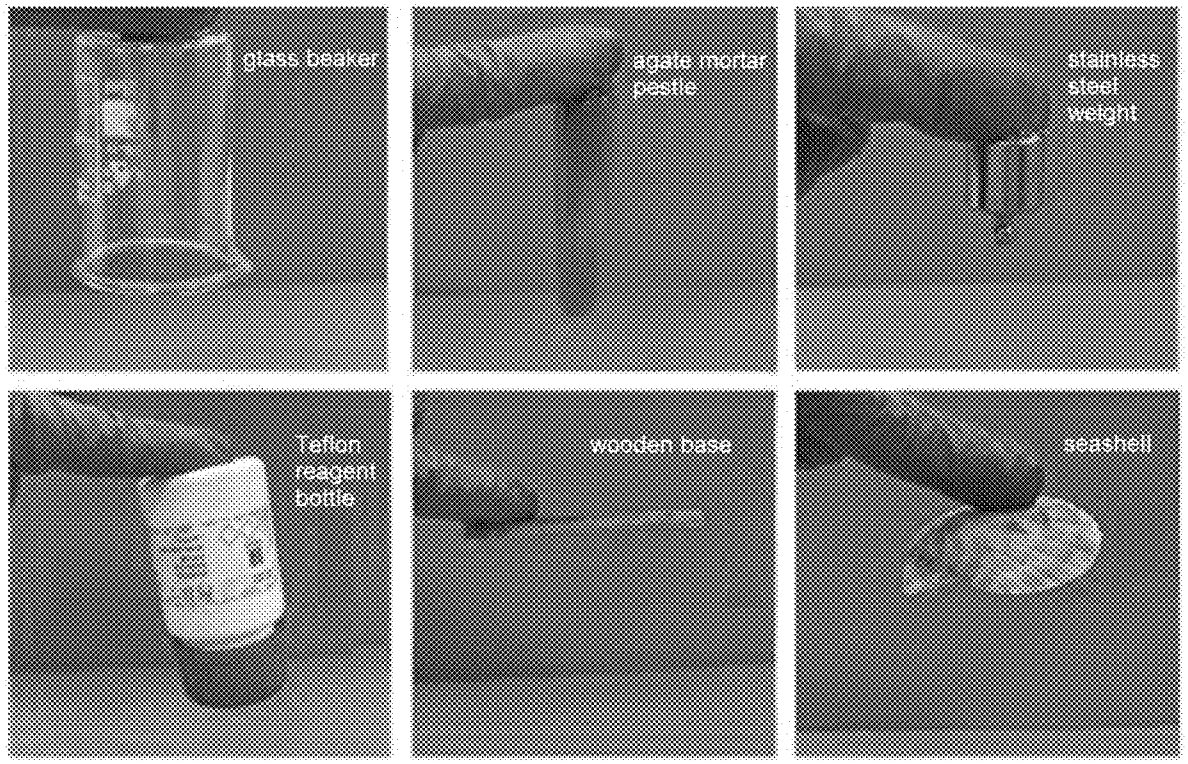
FIG. 3 shows digital photographs of the liquid metal/lipoic acid/tannic acid conductive hot melt adhesive prepared in Example 1 of the present disclosure bonding to different solid bases.

FIG. 3 shows digital photographs of liquid metal/lipoic acid/tannic acid conductive hot melt adhesive bonding to different solid bases. It can be seen from the figure that the conductive hot melt adhesive can bond to solid objects of different materials, demonstrating an obvious bonding ability.

Figure 4:
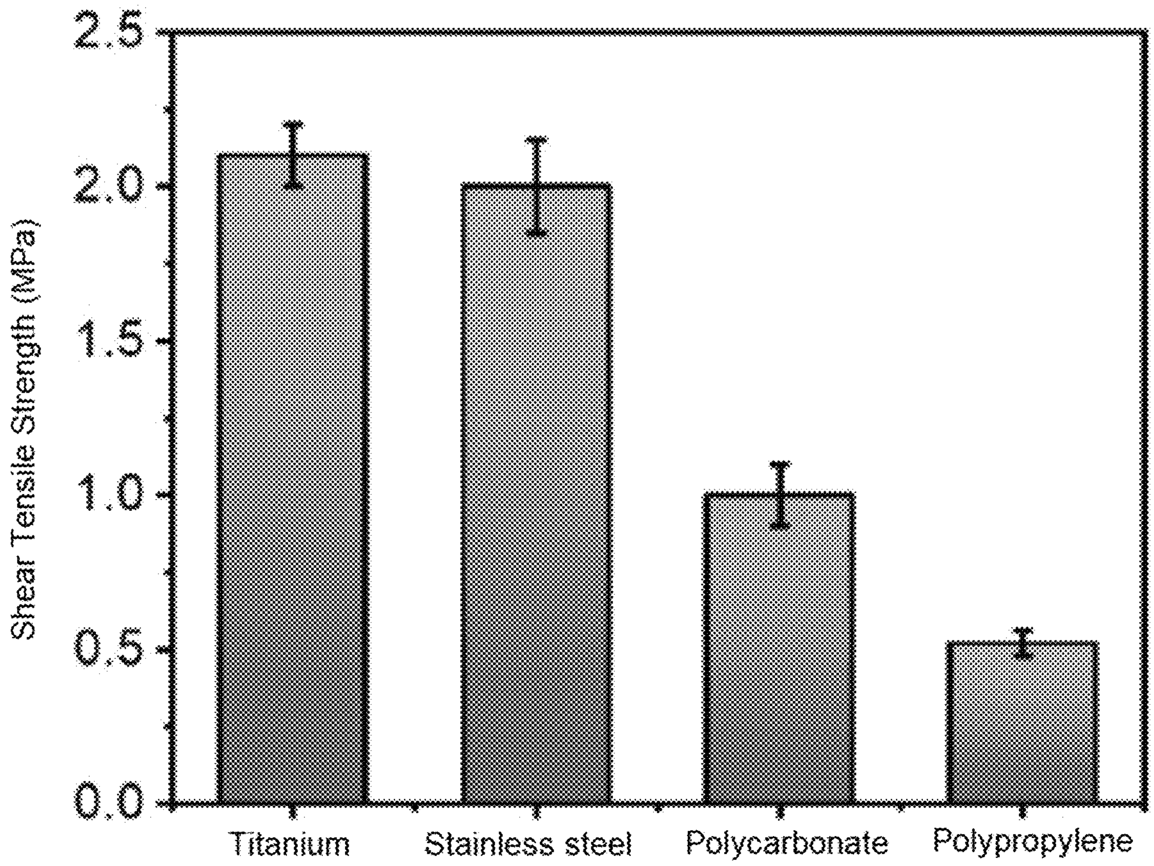
FIG. 4 is a bar chart showing the shear tensile strengths of the liquid metal/lipoic acid/tannic acid conductive hot melt adhesive prepared in Example 1 of the present disclosure bonding to different solid bases.

FIG. 4 is a chart showing the shear tensile strengths of the liquid metal/lipoic acid/tannic acid conductive hot melt adhesive bonding to different solid bases. It can be seen from the figure that the bonding strengths of the liquid metal/lipoic acid/tannic acid conductive hot melt adhesive to high-surface-energy bases are all greater than 1 MPa, indicating that it has a strong bonding strength.

Test Example 3 Light Welding Performance of Conductive Hot Melt Adhesive

Figure 5:
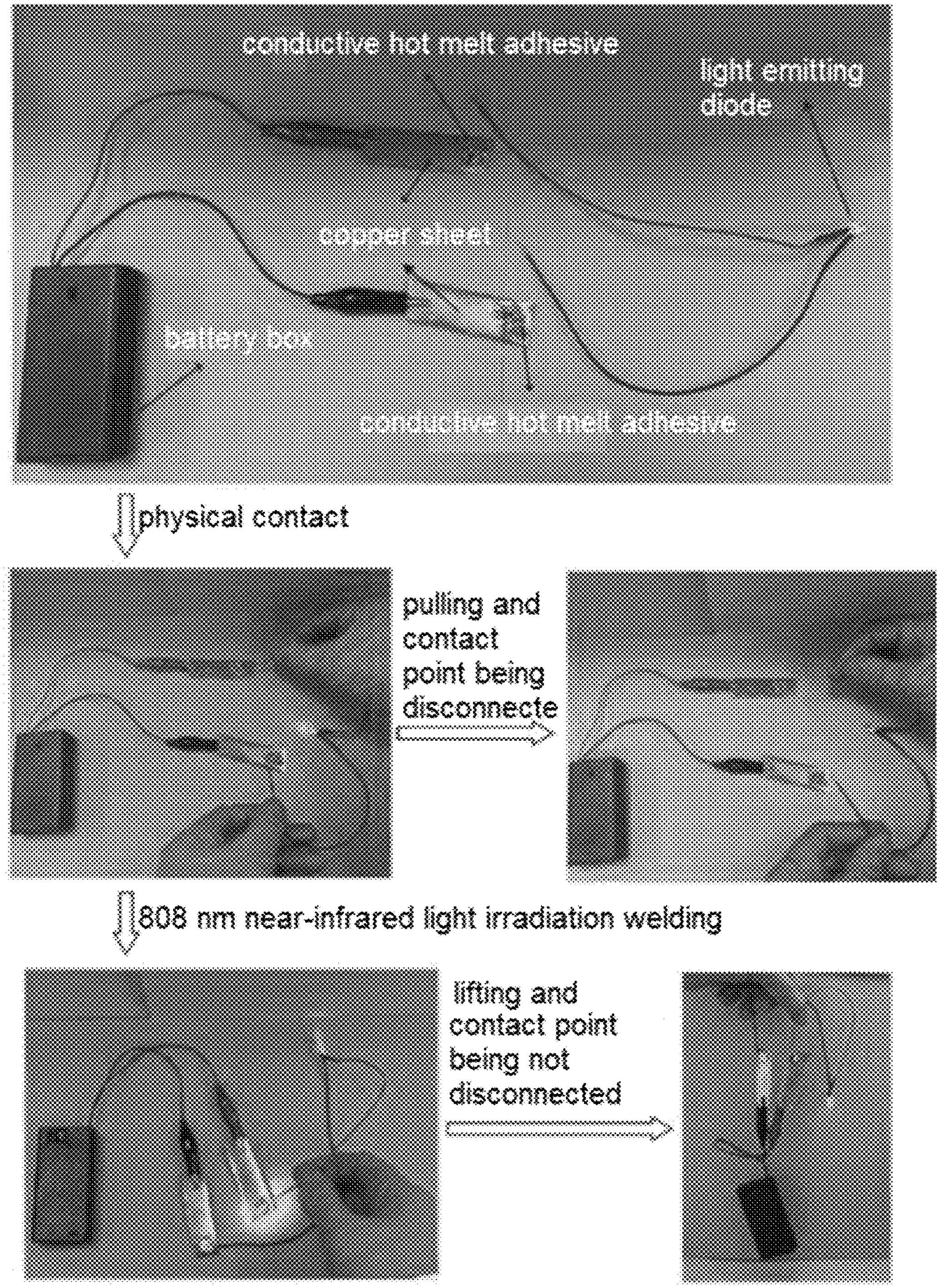
FIG. 5 shows a digital photograph of the liquid metal/lipoic acid/tannic acid conductive hot melt adhesive prepared in Example 1 of the present disclosure welding an LED lamp into a circuit under near-infrared light irradiation to form an effective circuit loop.

FIG. 5 shows a digital photograph of the liquid metal/lipoic acid/tannic acid conductive hot melt adhesive welding an LED lamp to a circuit through near-infrared light welding to form an effective circuit loop. It can be seen from the figure that the liquid metal/lipoic acid/tannic acid conductive hot melt adhesive may weld the LED lamp to the copper sheet circuit under 808 nm near-infrared light irradiation, and light up the LED lamp when the battery power is turned on. The LED light that was lit during the pulling of the wire did not flicker or fall off, indicating that the liquid metal/lipoic acid/tannic acid conductive hot melt adhesive has light welding characteristics.

EXAMPLE 2

Following the technical solution of Example 1 while keeping other conditions constant, a conductive hot melt adhesive was prepared by replacing 50 mg of lipoic acid and 10 mg of tannic acid with 65 mg of lipoic acid and 5 mg of tannic acid. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 2.0±0.15 MPa, 2.0±0.2 MPa, 1.0±0.1 MPa, and 0.5±0.07 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 3

Following the technical solution of Example 1 while keeping other conditions constant, a conductive hot melt adhesive was prepared by replacing 50 mg of lipoic acid and 10 mg of tannic acid with 45 mg of lipoic acid and 15 mg of tannic acid. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 2.2±0.26 MPa, 2.2±0.1 MPa, 1.1±0.05 Mpa, and 0.7±0.02 Mpa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 4

Following the technical solution of Example 1 while keeping other conditions constant, a conductive hot melt adhesive was prepared by replacing 140 mg of liquid metal with 130 mg of liquid metal and 10 mg of silver nanowires. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.3\times10^4$ S/m. The lap shear strengths of the conductive hot melt adhesive on titanium, stainless steel, polycarbonate, and polypropylene were 1.9±0.18 Mpa, 2.0±0.2 Mpa, 0.9±0.21 Mpa, and 0.61±0.1 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 5

Following the technical solution of Example 1 while keeping other conditions constant, a conductive hot melt adhesive was prepared by replacing 140 mg of liquid metal with 130 mg of liquid metal and 10 mg of silver nanosheets. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.5\times10^4$ S/m. The lap shear strengths of the conductive hot melt adhesive on titanium, stainless steel, polycarbonate, and polypropylene were 1.9±0.1 Mpa, 2.0±0.14 Mpa, 0.8±0.12 Mpa, and 0.58±0.08 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 6

Following the technical solution of Example 1 while keeping other conditions constant, a conductive hot melt adhesive was prepared by replacing 10 mg of tannic acid with 8 mg of polyvinyl alcohol (PVA). Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.9±0.1 Mpa, 1.8±0.1 Mpa, 0.94±0.11 Mpa, and 0.55±0.02 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 7

Following the technical solution of Example 1 while keeping other conditions constant, a conductive hot melt adhesive was prepared by replacing 10 mg of tannic acid with 12.5 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 2.0±0.18 Mpa, 1.8±0.1 Mpa, 0.85±0.16 Mpa, and 0.64±0.06 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 8

Following the technical solution of Example 1 while keeping other conditions constant, a conductive hot melt adhesive was prepared by replacing 10 mg of tannic acid with 11 mg of N,N,N',N'-tetrakis(2-hydroxyethyl) ethylenediamine. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 1.9±0.2 Mpa, 1.8±0.17 Mpa, 0.98±0.14 Mpa, and 0.60±0.05 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 9

Following the technical solution of Example 1 while keeping other conditions constant, a conductive hot melt adhesive was prepared by replacing 10 mg of tannic acid with 5 mg of tannic acid and 5 mg of PVA. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.9±0.15 Mpa, 1.9±0.2 Mpa, 1.0±0.07 Mpa, and 0.68±0.09 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 10

Following the technical solution of Example 1 while keeping other conditions constant, a conductive hot melt adhesive was prepared by replacing 10 mg of tannic acid with 5 mg of tannic acid and 5 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.8±0.2 Mpa, 1.9±0.13 Mpa, 0.95±0.1 Mpa, and 0.58±0.07 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 11

Following the technical solution of Example 1 while keeping other conditions constant, a conductive hot melt adhesive was prepared by replacing 10 mg of tannic acid with 5 mg of tannic acid and 5 mg of N,N,N',N'-tetrakis(2-hydroxyethyl) ethylenediamine. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 2.0±0.1 Mpa, 2.1±0.13 Mpa, 1.2±0.2 Mpa, and 0.75±0.08 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 12

Following the technical solution of Example 1 while keeping other conditions constant, a conductive hot melt adhesive was prepared by replacing 10 mg of tannic acid with 5 mg of PVA acid and 5 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.9±0.11 Mpa, 1.9±0.15 Mpa, 0.97±0.1 Mpa, and 0.62±0.04 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 13

Following the technical solution of Example 1 while keeping other conditions constant, a conductive hot melt adhesive was prepared by replacing 10 mg of tannic acid with 5 mg of PVA and 5 mg of N,N,N',N'-tetrakis(2-hydroxyethyl) ethylenediamine. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 1.8±0.12 MPa, 1.7±0.2 MPa, 0.86±0.1 MPa, and 0.51±0.07 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 14

Following the technical solution of Example 1 while keeping other conditions constant, a conductive hot melt adhesive was prepared by replacing 10 mg of tannic acid with 5 mg of chitosan and 5 mg of N,N,N',N'-tetrakis(2-hydroxyethyl) ethylenediamine. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 1.7±0.15 MPa, 1.7±0.2 MPa, 0.84±0.1 MPa, and 0.52±0.02 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 15

Following the technical solution of Example 1 while keeping other conditions constant, a conductive hot melt adhesive was prepared by replacing 10 mg of tannic acid with 3 mg of tannic acid, 3 mg of PVA and 4 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^4$ S/m. The lap shear strengths of the conductive hot melt adhesive on titanium, stainless steel, polycarbonate, and polypropylene were 1.8±0.2 MPa, 1.9±0.2 MPa, 1.0±0.1 MPa, and 0.7±0.09 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 16

Following the technical solution of Example 1 while keeping other conditions constant, a conductive hot melt adhesive was prepared by replacing 10 mg of tannic acid with 3 mg of tannic acid, 3 mg of PVA and 4 mg of N,N,N',N'-tetrakis(2-hydroxyethyl) ethylenediamine. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.8±0.13 MPa, 1.8±0.1 MPa, 1.0±0.1 MPa, 0.73±0.03 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 17

Following the technical solution of Example 1 while keeping other conditions constant, a conductive hot melt adhesive was prepared by replacing 10 mg of tannic acid with 3 mg of PVA, 3 mg of N,N,N',N'-tetrakis(2-hydroxyethyl) ethylenediamine and 4 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.0\times10^4$ S/m. The lap shear strengths of the conductive hot melt adhesive on titanium, stainless steel, polycarbonate, and polypropylene were 1.7±0.2 MPa, 1.8±0.15 MPa, 0.95±0.09 MPa, and 0.81±0.07 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

EXAMPLE 18

Following the technical solution of Example 1 while keeping other conditions constant, a conductive hot melt adhesive was prepared by replacing 10 mg of tannic acid with 2.5 mg of tannic acid, 2.5 mg of PVA, 2.5 mg of N,N,N',N'-tetrakis(2-hydroxyethyl) ethylenediamine and 2.5 mg of chitosan. Then, the electrical conductivity, tensile property, and photothermal property of the conductive hot melt adhesive were tested according to the steps described in the test example above. The electrical conductivity rate test showed that the electrical conductivity rate of the conductive hot melt adhesive was $2.1\times10^{4}$ S/m. The lap shear strengths of the conductive hot melt adhesive on titanium, stainless steel, polycarbonate, and polypropylene were 1.8±0.11 MPa, 1.9±0.1 MPa, 1.0±0.18 MPa, and 0.68±0.04 MPa, respectively. After irradiating the conductive hot melt adhesive with a 0.5 W near-infrared lamp at a wavelength of 808 nm for 1 min, a conductive hot melt adhesive with good bonding ability and conductive property may stilled be obtained.

Although embodiments of the present disclosure have been shown and described above, it will be appreciated that the embodiments described above are examples, and are not intended to limit the present disclosure. A person skilled in the art may make changes, modifications, substitutions, and variations to the above embodiments within the scope of the present disclosure.

The invention claimed is:

1. A conductive hot melt adhesive having near-infrared light welding characteristics, comprising following raw materials in percentage by mass: gallium indium liquid metal 65%-75%, lipoic acid 22.5%-27.5% and a polyvalent crosslinking agent 2.5%-7.5%, wherein the polyvalent crosslinking agent is any one or a mixture of more selected from the group consisting of tannic acid, polyvinyl alcohol, N,N,N',N'-tetrakis(2-hydroxyethyl) ethylenediamine and chitosan.

2. The conductive hot melt adhesive having near-infrared light welding characteristics according to claim 1, wherein a mass percentage of gallium is 75.5% to 100% and a mass percentage of indium is 0% to 24.5% in the gallium indium liquid metal.

3. The conductive hot melt adhesive having near-infrared light welding characteristics according to claim 1, wherein a light source for light welding is near-infrared light, a power of the light source is 0.5-2.0 W, and a wavelength of the near-infrared light is 780-1,100 nm.

4. The conductive hot melt adhesive having near-infrared light welding characteristics according to claim 3, wherein a distance between any of the light source and the conductive hot melt adhesive during a light welding process is 2.5-10.0 cm.

5. A method for preparing the conductive hot melt adhesive having near-infrared light welding characteristics, comprising following steps:

(1) weighing the raw materials according to mass percentages according to claim 1;

(2) mixing the gallium indium liquid metal, the lipoic acid and the polyvalent crosslinking agent, placing in an agate mortar, and grinding to obtain a precursor powder; and (3) heating the precursor powder to obtain the conductive hot melt adhesive having near-infrared light welding characteristics.

6. The method for preparing the conductive hot melt adhesive having near-infrared light welding characteristics according to claim 5, wherein the grinding in the step (2) is performed for a time of 15-25 min.

7. The method for preparing the conductive hot melt adhesive having near-infrared light welding characteristics according to claim 5, wherein the heating in the step (3) is performed at a temperature of 75-85° C. for a time of 25-35 min.

8. The method for preparing a conductive hot melt adhesive having near-infrared light welding characteristics according to claim 7, wherein the heating is any one of an oil bath, a water bath, an air bath and a metal bath.

9. The method for preparing a conductive hot melt adhesive having near-infrared light welding characteristics according to claim 5, wherein a mass percentage of gallium is 75.5% to 100% and a mass percentage of indium is 0% to 24.5% in the gallium indium liquid metal.

10. The method for preparing a conductive hot melt adhesive having near-infrared light welding characteristics according to claim 5, wherein a light source for light welding is near-infrared light, a power of the light source is 0.5-2.0 W, and a wavelength of the near-infrared light is 780-1,100 nm.

11. The method for preparing a conductive hot melt adhesive having near-infrared light welding characteristics according to claim 10, wherein a distance between any of the light source and the conductive hot melt adhesive during a light welding process is 2.5-10.0 cm.

* * * * *